(12) United States Patent
Brück

(10) Patent No.: US 10,677,129 B2
(45) Date of Patent: Jun. 9, 2020

(54) TANK SYSTEM FOR A REDUCING AGENT

(71) Applicant: Continental Automotive GmbH, Hannover (DE)

(72) Inventor: Rolf Brück, Bergisch Gladbach (DE)

(73) Assignee: Continental Automotive GmbH, Hannover (DE)

(*) Notice: Subject to any disclaimer, the term of this patent is extended or adjusted under 35 U.S.C. 154(b) by 74 days.

(21) Appl. No.: 16/060,911

(22) PCT Filed: Dec. 7, 2016

(86) PCT No.: PCT/EP2016/080024
§ 371 (c)(1),
(2) Date: Jun. 8, 2018

(87) PCT Pub. No.: WO2017/097814
PCT Pub. Date: Jun. 15, 2017

(65) Prior Publication Data
US 2018/0363525 A1    Dec. 20, 2018

(30) Foreign Application Priority Data
Dec. 10, 2015   (DE) .................. 10 2015 224 919

(51) Int. Cl.
*F01N 3/00*    (2006.01)
*F01N 3/20*    (2006.01)
*B01D 53/92*   (2006.01)

(52) U.S. Cl.
CPC ........... *F01N 3/206* (2013.01); *F01N 3/2066* (2013.01); *B01D 53/92* (2013.01);
(Continued)

(58) Field of Classification Search
CPC ................... F01N 3/206; B01D 53/92
(Continued)

(56) References Cited

U.S. PATENT DOCUMENTS 8,088,336 B2 *   1/2012   Suzuki ................... B01B 1/005
                                                   422/148
2009/0230136 A1 *  9/2009   Dougnier .............. F01N 3/2066
                                                   220/592.01
(Continued)

FOREIGN PATENT DOCUMENTS

DE    10 2010 029 594 A1    12/2011
DE    10 2011 006 105 A1     9/2012
(Continued)

OTHER PUBLICATIONS

English translation of German Patent Application Publication No. DE 102011006105 A1 (Year: 2012).*

*Primary Examiner* — Jason D Shanske
(74) *Attorney, Agent, or Firm* — Cozen O'Connor

(57) ABSTRACT

A tank system for a reducing agent includes: a vessel storing the reducing agent and having: an upper vessel wall, lateral vessel walls, a lower vessel wall forming a vessel base, a base region of the vessel having an opening, and an outer side of the vessel; and a conveying device on the outer side of the vessel that provides the reducing agent under pressure via an outlet to an exhaust gas. The conveying device with the outer side of the vessel forms a space S outside the vessel, the space S, via the opening, is connected to an interior of the vessel allowing reducing agent to flow from the interior into the space S and, by the conveying device, is suppliable from the space S to the exhaust gas and suctionable from the space S. A support is provided on the opening.

15 Claims, 2 Drawing Sheets

(52) U.S. Cl.
CPC ...... *F01N 2450/18* (2013.01); *F01N 2450/20* (2013.01); *F01N 2610/02* (2013.01); *F01N 2610/1406* (2013.01); *F01N 2610/148* (2013.01); *F01N 2610/1426* (2013.01); *F01N 2610/1433* (2013.01); *F01N 2610/1486* (2013.01); *Y02T 10/24* (2013.01)

(58) Field of Classification Search
USPC .......................................................... 60/295
See application file for complete search history.

(56) References Cited

U.S. PATENT DOCUMENTS

| | | | |
|---|---|---|---|
| 2010/0078426 A1* | 4/2010 | Li | F01N 3/2066 219/600 |
| 2012/0311999 A1* | 12/2012 | Hodgson | F01N 3/2006 60/295 |
| 2015/0210159 A1* | 7/2015 | Maguin | F01N 3/2066 60/295 |
| 2015/0285120 A1 | 10/2015 | Hodgson et al. | |
| 2016/0076423 A1* | 3/2016 | Akiyoshi | F01N 11/00 73/114.75 |

FOREIGN PATENT DOCUMENTS

| | | |
|---|---|---|
| DE | 2012 110 760 A1 | 5/2014 |
| EP | 2 336 515 A2 | 6/2011 |
| WO | WO 2015/036290 A1 | 3/2015 |

* cited by examiner

TANK SYSTEM FOR A REDUCING AGENT

CROSS REFERENCE TO RELATED APPLICATIONS

This is a U.S. national stage of application No. PCT/EP2016/080024 filed on 7 Dec. 2016, which claims priority to the Germany Application No. 10 2015 224 919.0 filed 10 Dec. 2015, the content of both incorporated herein by reference.

BACKGROUND OF THE INVENTION

1. Field of the Invention

The invention relates to a tank system for a reducing agent.

2. Related Art

It is known for reducing agents to be added to the exhaust gases of motor vehicles to reduce undesirable component parts, in particular nitrogen oxide compounds, of the exhaust gas, in that the nitrogen oxide compounds are converted to other compounds such as nitrogen, water, and carbon dioxide. A urea solution, which is also available under the AdBlue trademark, is need herein as the reducing agent. A vessel for the provision and storage of the urea solution is provided in motor vehicles. The vessel is connected to a conveying device. The conveying device is composed of a pump that suctions the reducing agent and dispenses the reduce agent under pressure into a conveying line. The urea solution, by way of the conveying line, makes its way to an injection device which injects the urea solution into an exhaust gas line and into the exhaust gas flowing therein. The conveying device has further components such as filling level transducers, sensors, filters, and heating devices, which are provided for the safe and reliable operation of the tank system.

It is furthermore known for an opening to be incorporated in the vessel for the conveying device to be disposed in the interior of the vessel. The opening in the vessel is closable by a flange. The urea solution conveyed by the conveying device is guided out of the vessel and to the exhaust gas line by way of an outlet integrated in the flange. It is disadvantageous that complete emptying of the vessel is not possible in the case of the conveying device being disposed through an opening in the base of the vessel. Even when the conveying device is able to empty the vessel down to a filling level of a few millimeters in the vessel, by virtue of the base area a significant residual volume that is not conveyable remains in the vessel.

SUMMARY OF THE INVENTION

It is therefore an object of the invention to achieve a tank system by way of which almost complete emptying of the vessel is possible. Such a tank system enables the vessel to be emptied using little complexity.

According to one aspect of the invention, the object can be achieved according to the invention by a tank system for a reducing agent, having an upper vessel wall, lateral vessel walls, and a lower vessel wall, a conveying device in order for the reducing agent to be suctioned and to be provided under pressure so as to be suppliable by way of an outlet to an exhaust gas. An opening is provided in the base region of the vessel, the conveying device being disposed on the outer side of the vessel such that the conveying device conjointly with the outer side of the vessel forms a space S, wherein the space S, by way of the one opening, is connected to the interior of the vessel such that a reducing agent located in the vessel can make its way from the interior of the vessel into the space S located outside the vessel, and is capable of being suctioned from the space S by the conveying device a support separate from the conveying device being provided on the opening, and the support being connected to further components.

By way of the arrangement of the conveying device on the outer side of the vessel, the conveying device conjointly with the outer side forms a space S. The space S by way of an opening in the vessel wall is connected to the interior of the vessel, wherein the opening is disposed in the region of the vessel base where the outer side of the vessel and the conveying device form the space S. The opening enables the inflow of the reducing agent into the space S where the reducing agent is suctioned by the conveying device and conveyed to the exhaust gas line of the motor vehicle. The arrangement of the conveying device outside the vessel permits a particularly low suction point such that the vessel can be almost completely emptied. Vessels having a very large utilizable volume can thus be implemented by way of the tank system according to the invention. The conveying device can be configured so as to be smaller by way of the arrangement of components on the support, this leading to a reduction in terms of the installation space required.

In order for a simple connection of the conveying device to the outer side of the vessel to be guaranteed it has proven advantageous for the conveying device to have a flange surrounding the conveying device, and for the flange to be connected to the outer side of the vessel in order for the space S to be formed.

The connection of the conveying device to the outer side of the vessel is constructed in a particularly simple manner when the conveying device, in particular the flange thereof, is adhesively bonded or welded to the vessel. Additional sealing elements can be dispensed with in the case of such a liquid-tight connection. As a result, the tank system is constructed in a simpler and more cost-effective manner.

In another aspect, the connection of the conveying device to the vessel is configured as a bayonet connection. To this end, the flange has a metallic insert part brought to engage with a corresponding counterpart disposed in the vessel base. The advantage of this connection lies in that the conveying device, in particular for repair and/or maintenance, can be separated from the vessel without any additional effort and be subsequently again connected to the vessel in a liquid-tight manner.

In order for the accessibility to all or some components to be guaranteed even in the case of a filled vessel, it has proven advantageous for the conveying device to comprise a housing in which the components are disposed. For this purpose, the housing is provided with a lid or a cover. The accessibility is thus independent of the filling level in the vessel; dismantling the vessel is also not required.

Connecting the support to the vessel according to a further advantageous design embodiment is facilitated in that structure that connects the support to the lower vessel wall is disposed on the opening. In the simplest case, a welded flange is disposed on or around the opening.

In a manner analogous to that of the fastening of the conveying device, the support can also foe connected to the lower vessel wall by way of a bayonet closure. In as far as an insert part is provided for the bayonet connection in the lower vessel wall, the insert part according to another aspect can be configured so as to be integral to the insert part for the connection to the conveying device.

In another advantageous aspect, elevations that penetrate corresponding clearances of the support and by heat staking are deferrable such that the support is positioned in relation to the opening are configured in the lower vessel wall. A simple and durable fastening can be implemented in this manner.

For a releasable fastening and a simultaneously secure fit of the supports the connection according to another aspect is configured as a latching connection, wherein either latching hooks or latching locations are disposed in the lower vessel wall, and the respective corresponding counterpart is configured on the support.

By way of the arrangement of the support on the opening it can, under certain circumstances be desirable for a defined exit of the reducing agent from the vessel into the space S to be generated. A non-defined overflow can foe prevented in that the support has a seal which surrounds the opening.

The object of the openings lies in allowing sufficient reducing agent to pass from the vessel into the space S located outside the vessel. In order for this to be guaranteed, the cross section of all openings has to be of a sufficient size. A measure for the cross-sectional area is the porosity of the region of the vessel that, conjointly with the conveying device, forms the space S. The porosity is a result of the proportion of the cross-sectional areas of all openings in relation to the total area of the vessel region. The porosity herein can be 95% to 2%, preferably 80% to 4%, and particularly 50% to 6%. The porosity is lower in the case of large areas of the vessel region, and higher in the case of comparatively small areas.

A filter is provided for protecting the conveying device and the subsequent injection of the urea solution into the exhaust gas.

The construction of the filter is already predefined by the arrangement of the filter on the conveying device, and the complexity of the conveying device is increased. According to an advantageous aspect, the complexity of the conveying device can be reduced when the filter is disposed on the support. A potential aspect lies in providing the support as a base frame having at least one opening, and in disposing the filter such that the filter spans or covers the openings such that the reducing agent exiting the vessel is filtered. Non-filtered reducing agent is thus located in the vessel, and filtered reducing agent is thus located in the space S.

According to a further advantageous aspect, the support is connected to a filling level sensor, preferably an ultrasonic sensor. The arrangement in a manner separate from the conveying device has the advantage that the filling level sensor does not have to measure through the support. Any influence by the support is thus precluded. Moreover, the support permits a positioning of the filling level sensor outside the circumference of the support, on account of which adaptations to different vessel shapes are enabled.

In a further advantageous aspect the support is connected to a quality sensor, this likewise enabling the adaptation to various vessel shapes.

In another aspect, the quality sensor disposed on the support extends into the space S. The quality of the filtered and thus pure reducing agent and not that of the non-filtered reducing agent is thus determined.

In order for freezing of the urea solution to be prevented in operation, or in order for a rapid thawing of a frozen urea solution to be enabled, the support according to a further advantageous aspect is connected to a heating device. The arrangement on the support enables a greater potential and an adaptation of the heating device to the vessel. On account of the arrangement on the support, the space S is also simultaneously and conjointly heated such that a separate heating is not required.

In another aspect, the region of the vessel which conjointly with the conveying device forms the space S has at least one inversion that is directed into the interior of the vessel. This has the advantage that the conveying device can plunge into the inversion, wherein the conveying device is, however, still disposed outside the vessel. It is enabled by virtue of this arrangement that the conveying device can be completely disposed in the inversion. A tank system of this type therefore requires less installation space than a comparable vessel having a lower vessel wall without an inversion. The opening in this case is located in the vessel base that is shaped as an inversion, wherein the conveying device penetrates neither the vessel base nor the opening located in the latter.

BRIEF DESCRIPTION OF THE DRAWINGS

The invention will be explained in more detail by way of a plurality of exemplary embodiments. In the figures.

DETAILED DESCRIPTION OF THE PRESENTLY PREFERRED EMBODIMENTS

Figure 1:
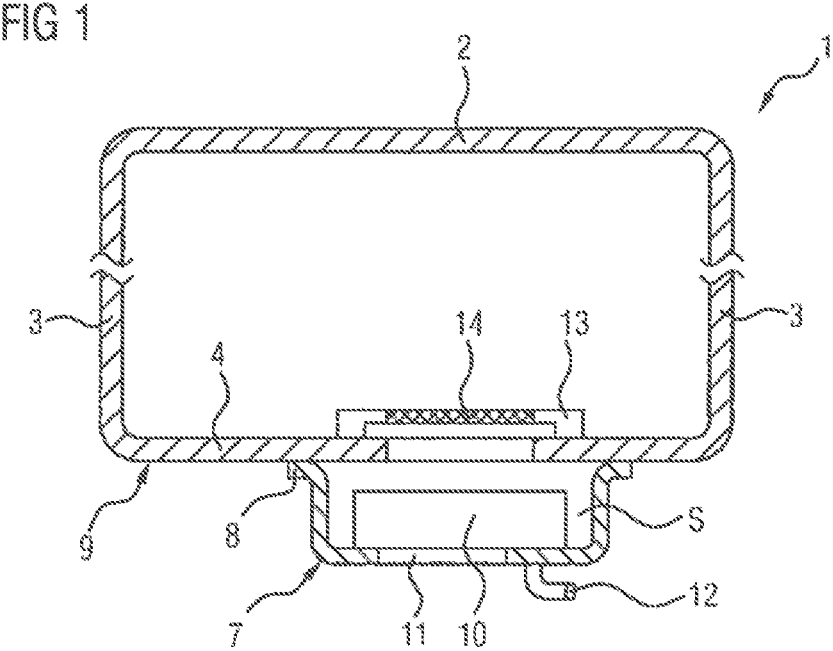
FIG. 1 shows a tank system according to the invention.

FIG. 1 shows a tank system having a vessel 1, which in the installed position, has an upper vessel wall 2, a filling portion (not illustrated) for the reducing agent, lateral vessel walls 3, and a lower vessel wall 4. The lower vessel wall 4 forms the base of the vessel 1. The vessel 1 is composed of plastics. However, it is also conceivable for the vessel to be produced from metal. An opening 6 is disposed in a flat base region 5 of the lower vessel wall 4. A conveying device 7 is located outside the vessel 1. The conveying device 7 has a flange 8, surrounding the conveying device 7, which is welded to the outer side 9 of the vessel 1. The conveying device 7, conjointly with the outer side 9 of the vessel 1, encloses a volume such that the conveying device 7 and the outer side 9 form a space S. The conveying device 7 is thus disposed completely outside the vessel 1 and does not penetrate the latter. The space S is connected to the interior of the vessel 1 by the opening 6 in the lower vessel wall 4. On account thereof, a urea solution stored in the interior of the vessel can flow through the vessel wall 4 to the outside into the space S. The conveying device 7 has a housing 10 in or on which various components (not illustrated in more detail), for example a pump, pressure regulators, can be disposed. The housing 10 furthermore comprises a lid 11 that closes the housing 10. The urea solution located in the space S can be suctioned by the pump and by way of an outlet 12 be supplied under pressure into a conveying line of an exhaust gas line, the urea solution being admixed to the exhaust gas in the conveying line. The space S, by virtue of the exposed position of the conveying device 7 on the outer side of the vessel 1, is comparatively sensitive to temperature influences. The space S, in particular in the case of low temperatures, freezes prior to the adjacent volume in the interior of the vessel 1. The associated enlargement of the volume in the space S leads to the volume by virtue of the opening 6 being able to expand in the direction of the vessel 1, on account of which critical stresses in the space S and thus in the conveying device are avoided. The opening 6 has a support 13, which is disposed on the opening 6. The support 13 has as a component a filter 14, which is integrated in the support 13.

Figure 2:
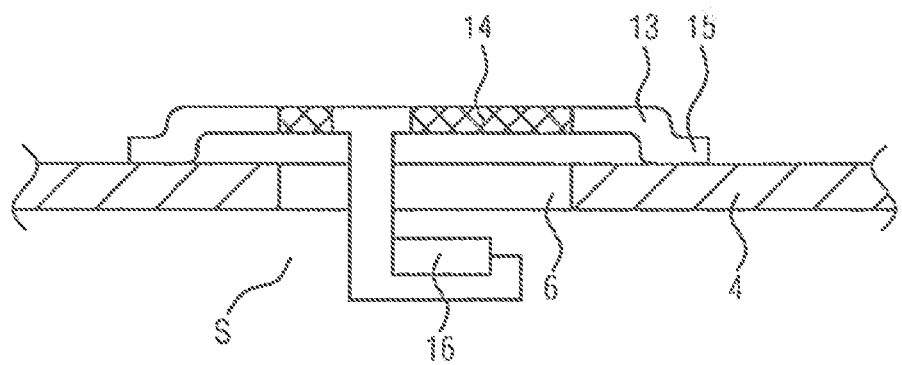
FIGS. 2-4 show fastenings of the support.

FIG. 2 shows the base region of the vessel 1 having the lower vessel wall 4, which contains an opening 6. The conveying device 7 disposed outside the vessel 1 and below the opening 7 is not illustrated. The opening 6 is covered by the support 13, wherein the support 13 has a porosity of 40% and thus acts as the filter 14. The support 13 has an encircling flange 15 by way of which the support 13 is welded to the vessel wall 4. The support furthermore has an ultrasonic sensor 16 that acts as a quality sensor and protrudes into the space S and therein measures the quality of the urea solution.

Figure 3:
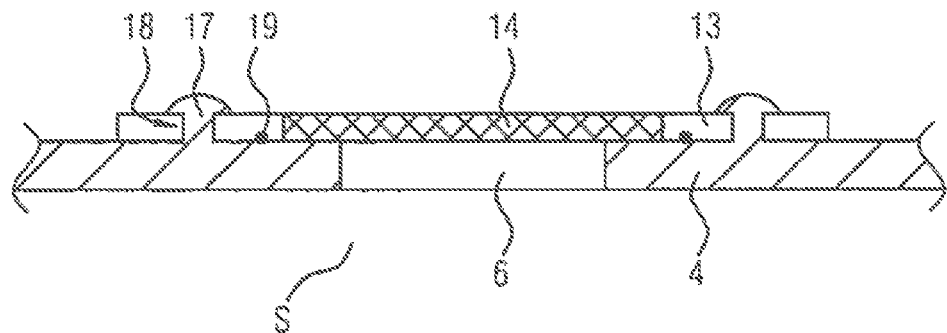

According to FIG. 3, cylindrical elevations 17, which engage in clearances on the support 13, are disposed on the lower vessel wall 4. The ends of the elevations 17 are plastically deformed by heat staking, on account of which the support 13 is positionally fixed on the lower vessel wall 4. A seal 19 prevents urea solution from the interior of the vessel 1 can makes its way between the lower vessel wall 4 and the support 13 to the outside into the space S.

Figure 4:
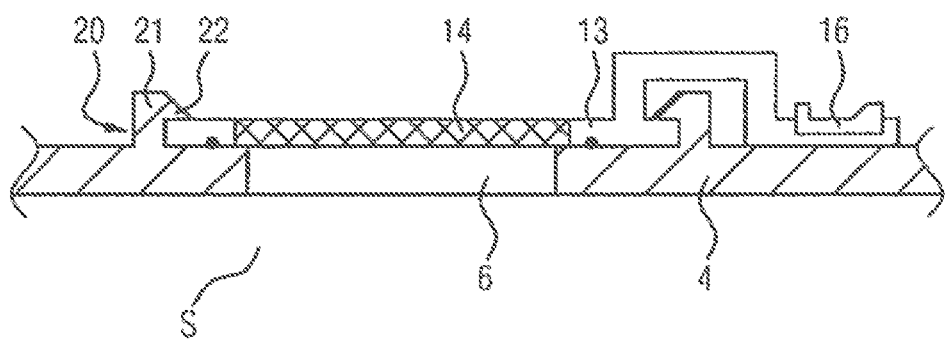

The support 13 in FIG. 4 is fixed to the lower vessel wall 4 by way of a latching connection 20. To this end, latching hooks 21 located on the vessel 1 engage in latching locations 22 configured on the support 13. An ultrasonic sensor 16 that operates as a filling level sensor is disposed as a further component on the support 13. The support 13 herein is configured such that the ultrasonic sensor 16 is disposed in the interior of the vessel 1 on a point that is sufficiently deep for the measurement, such as on the lower vessel wall.

Figure 5:
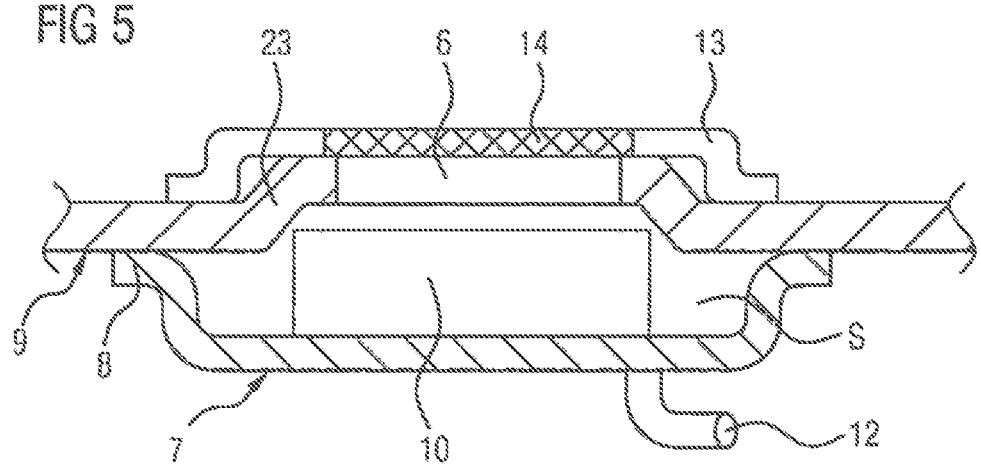
FIG. 5 shows a further embodiment having a support.

FIG. 5 shows a tank system which differs from that according to FIG. 1 in that the lower vessel wall 4 in the region of the vessel 1 that conjointly with the conveying device 7 forms the space S has at least one inversion 23 that is directed into the interior of the vessel.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tank system for a reducing agent, comprising:
a vessel (1) configured to store the reducing agent, the vessel (1) having:
an upper vessel wall (2),
lateral vessel walls (3),
a lower vessel wall (4) configured to form a base of the vessel (1),
a base region (5) of the vessel (1), the base region (5) of the vessel (1) having an opening (6), and
an outer side (9) of the vessel (1); and
a conveying device (7), arranged on the outer side (9) of the vessel (1), the conveying device being configured to provide the reducing agent under pressure by way of an outlet to an exhaust gas,
wherein:
the conveying device (7) is disposed on the outer side (9) of the vessel (1) such that the conveying device (7), conjointly with the outer side (9) of the vessel (1), forms a space S located outside the vessel (1), and
the space S, by way of the opening (6), is connected to an interior of the vessel (1) such that reducing agent located in the vessel (1) can flow from the interior of the vessel (1) into the space S located outside the vessel (1) and, by way of the conveying device (7), is suppliable from the space S to the exhaust gas and is suctionable from the space S by the conveying device (7), wherein a support (13) separate from the conveying device (7) is provided on the opening (6), and the support (13) is connected to further components (14, 16), wherein the support (13) has a surrounding support flange forming a receiving portion configured to contact an inversion (23) formed in the lower vessel wall (4), the inversion (23) being directed into the interior of the vessel (1).

2. The tank system as claimed in claim 1, wherein the conveying device (7) has a flange (8) surrounding the conveying device (7), and the flange (8) is connected to the outer side (9) of the vessel (1) to form the space S.

3. The tank system as claimed in claim 2, wherein structure (15, 17, 18, 20) that connects the support (13) to the lower vessel wall (4) is disposed on the opening (6).

4. The tank system as claimed in claim 3, wherein the structure (15, 17, 18, 20) comprises a welded flange (15).

5. A tank system for a reducing agent, comprising:
a vessel (1) configured to store the reducing agent, the vessel (1) having:
an upper vessel wall (2),
lateral vessel walls (3),
a lower vessel wall (4) configured to form a base of the vessel (1),
a base region (5) of the vessel (1), the base region (5) of the vessel (1) having an opening (6), and
an outer side (9) of the vessel (1); and
a conveying device (7), arranged on the outer side (9) of the vessel (1), the conveying device being configured to provide the reducing agent under pressure by way of an outlet to an exhaust gas,
wherein:
the conveying device (7) is disposed on the outer side (9) of the vessel (1) such that the conveying device (7), conjointly with the outer side (9) of the vessel (1), forms a space S located outside the vessel (1),
the space S, by way of the opening (6), is connected to an interior of the vessel (1) such that reducing agent located in the vessel (1) can flow from the interior of the vessel (1) into the space S located outside the vessel (1) and, by way of the conveying device (7), is suppliable from the space S to the exhaust gas and is suctionable from the space S by the conveying device (7), wherein a support (13) separate from the conveying device (7) is provided on the opening (6), and the support (13) is connected to further components (14, 16),
structure (15, 17, 18, 20) that connects the support (13) to the lower vessel wall (4) is disposed on the opening (6), and wherein the structure (15, 17, 18, 20) comprises elevations (17) that penetrate corresponding clearances

(18) of the support (13) and are deformable by heat staking such that the support (13) is positioned in relation to the opening (6).

6. A tank system for a reducing agent, comprising:
a vessel (1) configured to store the reducing agent, the vessel (1) having:
    an upper vessel wall (2),
    lateral vessel walls (3),
    a lower vessel wall (4) configured to form a base of the vessel (1),
    a base region (5) of the vessel (1), the base region (5) of the vessel (1) having an opening (6), and
    an outer side (9) of the vessel (1); and
a conveying device (7), arranged on the outer side (9) of the vessel (1), the conveying device being configured to provide the reducing agent under pressure by way of an outlet to an exhaust gas,
wherein:
the conveying device (7) is disposed on the outer side (9) of the vessel (1) such that the conveying device (7), conjointly with the outer side (9) of the vessel (1), forms a space S located outside the vessel (1),
the space S, by way of the opening (6), is connected to an interior of the vessel (1) such that reducing agent located in the vessel (1) can flow from the interior of the vessel (1) into the space S located outside the vessel (1) and, by way of the conveying device (7), is suppliable from the space S to the exhaust gas and is suctionable from the space S by the conveying device (7), wherein a support (13) separate from the conveying device (7) is provided on the opening (6), and the support (13) is connected to further components (14, 16),
structure (15, 17, 18, 20) that connects the support (13) to the lower vessel wall (4) is disposed on the opening (6), and wherein the structure (20) is configured as a latching connection (20) configured to affix the support (13) to the lower vessel wall (4) using latching hooks (21) and latching locations (22) of the latching connection (20) configured on the support (13).

7. The tank system as claimed in claim 1, wherein the support (13) has a seal (19) surrounding the opening (6).

8. The tank system as claimed in claim 1, wherein the support (13) has a porosity of 2% to 95%.

9. The tank system as claimed in claim 1, wherein the support (13) is connected to a filter (14).

10. The tank system as claimed in claim 1, wherein the support (13) is connected to an ultrasonic filling level sensor (16).

11. The tank system as claimed in claim 1, wherein the support (13) is connected to a quality sensor (16).

12. The tank system as claimed in claim 11, wherein the quality sensor (16) protrudes into the space S.

13. The tank system as claimed in claim 1, wherein the support (13) is connected to a heater.

14. The tank system as claimed in claim 1, wherein the support (13) has a porosity of 4% to 80%.

15. The tank system as claimed in claim 1, wherein the support (13) has a porosity of 6% to 50%.

* * * * *